US007073134B1

(12) United States Patent
Ogami

(10) Patent No.: US 7,073,134 B1
(45) Date of Patent: Jul. 4, 2006

(54) USER MODULE PARAMETER AND REGISTER CONFIGURATION BLOCK

(75) Inventor: Kenneth Y. Ogami, Bothell, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 572 days.

(21) Appl. No.: 10/164,465

(22) Filed: Jun. 5, 2002

(51) Int. Cl.
*G06F 6/00* (2006.01)

(52) U.S. Cl. ................ 715/765; 715/719; 715/763
(58) Field of Classification Search ........... 715/719, 715/721, 765, 763
See application file for complete search history.

(56) References Cited

U.S. PATENT DOCUMENTS 5,500,934 A * 3/1996 Austin et al. ............... 715/853
5,825,361 A * 10/1998 Rubin et al. ............... 715/839
6,473,766 B1 * 10/2002 Leiserson et al. ........... 707/102

* cited by examiner

*Primary Examiner*—Cao (Kevin) Nguyen

(57) ABSTRACT

A method and mechanism for configuring a programmable device are described. The method includes displaying a graphical user interface, which presents a graphical depiction of the programmable device, selecting a functional user module in the graphical user interface, placing the functional user module in the graphical depiction of the programmable device, and automatically generating configuration code to implement the functional user module in the programmable device in accordance with its graphical placement. The functional user module to be implemented can be selected from either a graphically depicted library of functional user modules or a tabular list. Parameter registers and settings options for the user module can be displayed and edited in pop-up windows or drop-down lists.

24 Claims, 7 Drawing Sheets

USER MODULE PARAMETER AND REGISTER CONFIGURATION BLOCK

FIELD OF THE INVENTION

Embodiments of the present invention relate to the field of configuring and programming programmable logical devices.

BACKGROUND OF THE INVENTION

Application-specific integrated circuits (ASICs), have been supplanted more and more by integrated circuits (ICs) that can be programmed to fulfill multiple functions. There are now many various programmable logic architectures, including, for example, programmable logic devices ("PLDs"), programmable logic arrays ("PLAs"), complex programmable logic devices ("CPLDs"), field programmable gate arrays ("FPGAs") and programmable array logic ("PALs"). Although there are differences between these various architectures, each of the architectures typically includes a set of input conductors coupled as inputs to an array of logic gates (e.g., a product term array made up of logical AND gates), the outputs of which, in turn, act as inputs to another portion of the logic device. Complex Programmable Logic Devices ("CPLDs") are large scale PLDs that, like all programmable architectures, are configured to the specific requirements of an application by programming.

Each of these architectures, originally programmed once for a specific function which would be a device's only function for its lifetime, has begun to be implemented in a reprogrammable form. A programmable logic device can now be re-programmed in operation and can fulfill the functions of many different devices.

The complexity of a programmable device requires complex programming of each of its configurations which can be stored. Each stored configuration reprogramming can be accomplished "on the fly" by applying the stored configuration to the device.

Initial programming of a highly complex device, though, can be tedious and time consuming. Numerous tools have been developed to aid the programmer in forming each configuration necessary to each device. However, even with current configuration tools, a programmer must track innumerable lines of programming and device characteristics in order to properly establish a complex device configuration.

In order to configure a hardware block in certain programmable devices, certain registers must be configured. The process of selecting those registers and the values that need to be programmed in them to achieve a particular function in the hardware, is typically performed manually, register by register, in conventional software tools. The process requires a burdensome level of expertise on the part of the programmer and an enormous number of manual, error-prone, and tedious tasks to be done which can limit the market of users of these complex programmable devices.

A need exists, therefore, for a method for improving and streamlining the programming of highly complex programmable devices to perform the functions required of each programmed device configuration. Furthermore, such a method must be user-friendly, enabling a user of normal skills to rapidly configure enormously complex programmable devices with multiple configurations.

SUMMARY OF THE INVENTION

Disclosed herein is a method for improving and streamlining the programming of highly complex programmable devices to perform the functions required of each programmed device configuration. The method is user-friendly, enabling a user of normal skills to rapidly configure enormously complex programmable devices with multiple configurations.

Embodiments of the present invention relate to a method and mechanism for configuring a programmable logical device. The method comprises displaying a graphical user interface, which presents a graphical depiction of the programmable logical device, selecting a functional user module in the graphical user interface, placing the functional user module in the graphical depiction of the programmable logical device, and automatically generating configuration code to implement the functional user module in the programmable logical device in accordance with its graphical placement. The functional user module to be implemented can be selected from either a graphically depicted library of functional user modules or a tabular list. Parameter registers and settings options for the user module can be displayed and edited in pop-up windows or drop-down lists.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The operation and components of this invention can be best visualized by reference to the drawings.

FIG. 3 illustrates a user module selection window from a graphical user interface (GUI) in accordance with one embodiment of the present invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention. At times, concepts disclosed in this discussion of embodiments of the present invention will be made more readily apparent be reference to the Figures. This discussion of embodiments of the present invention is meant to be read in light of the disclosure of a configuration tool that is incorporated herein by reference to patent application U.S. Ser. No. 09/989,570 entitled "METHOD FOR FACILITATING MICROCONTROLLER PROGRAMMING," filed Nov. 19, 2001 and assigned to the assignee of the present invention.

The embodiment of the present invention discussed herein features the use of a graphical information window in a graphical user interface presented in a graphic display. The term "graphical information," as used in this discussion, may include both icons and text. While the particular portions of the graphic display envisioned as the device selection window and the module placement window is, in this embodiment, a particular area in the overall graphic display, other embodiments could use a different area of the display.

Figure 1:
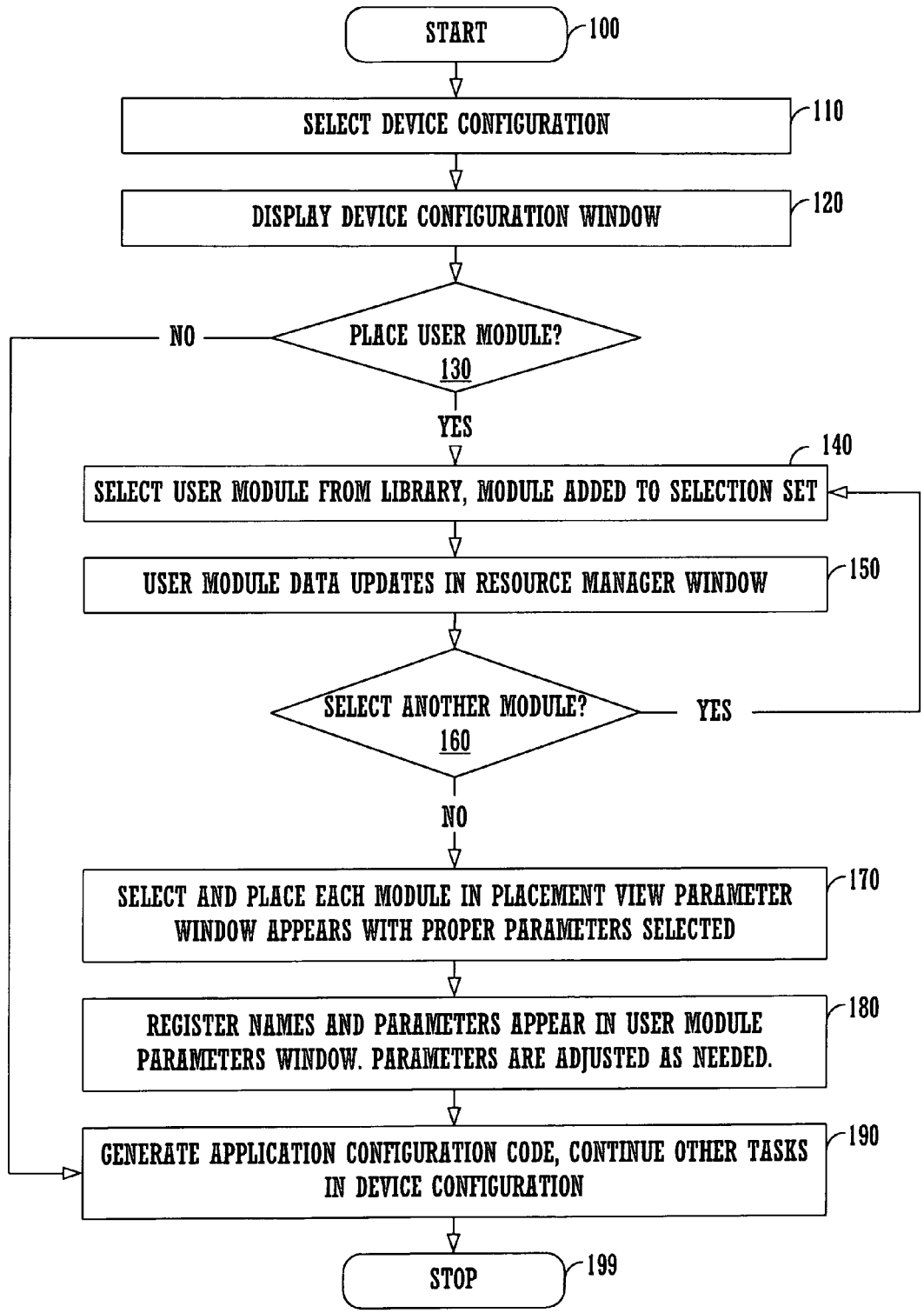
FIG. 1 illustrates a user module configuration method in accordance with one embodiment of the present invention.

The method of selecting and placing functional user modules is illustrated in block flow diagram form in FIG. 1. Process 100 starts when device configuration is selected, 110. The device configuration window is displayed, 120 and the user can then elect at 130 whether to place a user module. If a user module is to be placed, it is selected at 140 from the user module library, the user module data updates in the resource manager window, and the selected user module is added the selection set. User module data then updates in the resource manager window at 150. If another user module is needed, 160, it is selected as before. When the desired user modules have been selected, they are placed in the graphic device depiction in the module placement window at 170 and the module parameter window appears. Register parameters are adjusted as needed at 180 with each module. The application code is generated automatically at 190, and the configuration process ends at 199.

An important enablement of a graphical user interface is the ability to accept commands related to graphic information in the display. Such commands are generally input by "mouse-click." A mouse-click refers to any selection method that involves deliberate action on the part of the user specifically related to the position of a cursor in the graphical user interface display, usually involving the user depressing a button on a cursor control mouse. A mouse click can also be implemented by any other means related to cursor control including cursor control by keyboard buttons.

A programmable microcontroller can be an especially complex device, in any function to which it is configured. In a programmable device of normal configured complexity, configuration can be resolved into a collection of functional blocks, which may be known as User Modules (UMs), that are implemented by the configuration program from configurable hardware blocks. In order to configure a hardware block, certain registers within the configuring device need to be identified, named and stored with the appropriate values. The process of selecting those registers that need to be configured and the values that need to be programmed therein to achieve a particular function from the hardware is typically performed manually in conventional software tools. This is a very error-prone and tedious process that is greatly streamlined by the configuration tool that includes this embodiment of the present invention.

Figure 2:
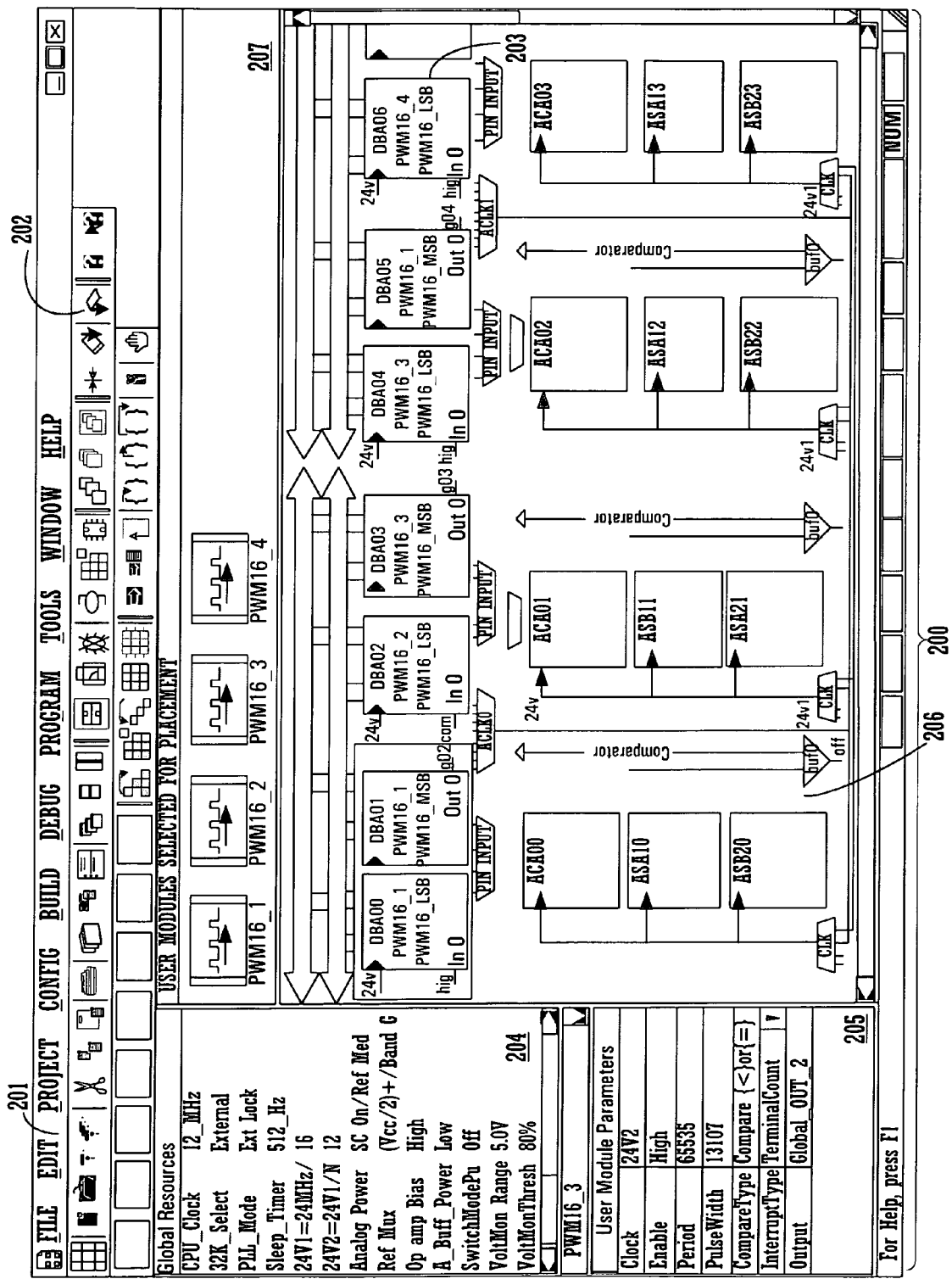
FIG. 2 illustrates an exemplary screen shot of a graphical user interface (GUI) in accordance with one embodiment of the present invention.

The configuration tool referenced earlier employs a graphical user interface to greatly ease the lengthy and tedious process of configuring complex programmable devices. FIG. 2 illustrates a screenshot of the Device Placement Window in the configuration tool's graphical user interface. When the user has selected a group of user modules suitable to the configuration desired, the Device placement Window 200 shown in FIG. 2 is presented to further aid in device configuration. Again, selected modules are shown in iconic form in window 207. Each icon is highlighted when selected for placement in the graphical presentation of the programmable device architecture, 203, shown in window 206, by the selection of Next Placement tool button (see 504 in FIG. 5). Available connections, determined by the available hardware, are highlighted to aid the user in placement. Global Parameters window 204 is also shown to aid the user in determining what characteristics and parameters are available. As each user module is placed, its associated parameters window 205 appears. Note that the specific exemplary screenshots used in this discussion of the present embodiment are related to the configuration of a microcontroller which is only one of many different configurable functions of the devices to which this embodiment of the present invention is addressed.

Also included in FIG. 2 is information window 206 which shows a diagram view of available modules remaining, in consideration of hardware circuitry already committed to the selected user modules. Note that the functions of the various windows illustrated here may be present in different forms in different embodiments or may not be employed in others. The rearrangement of windows in the graphical user interface does not impede nor change the functionality of this embodiment of the present invention.

Figure 3:
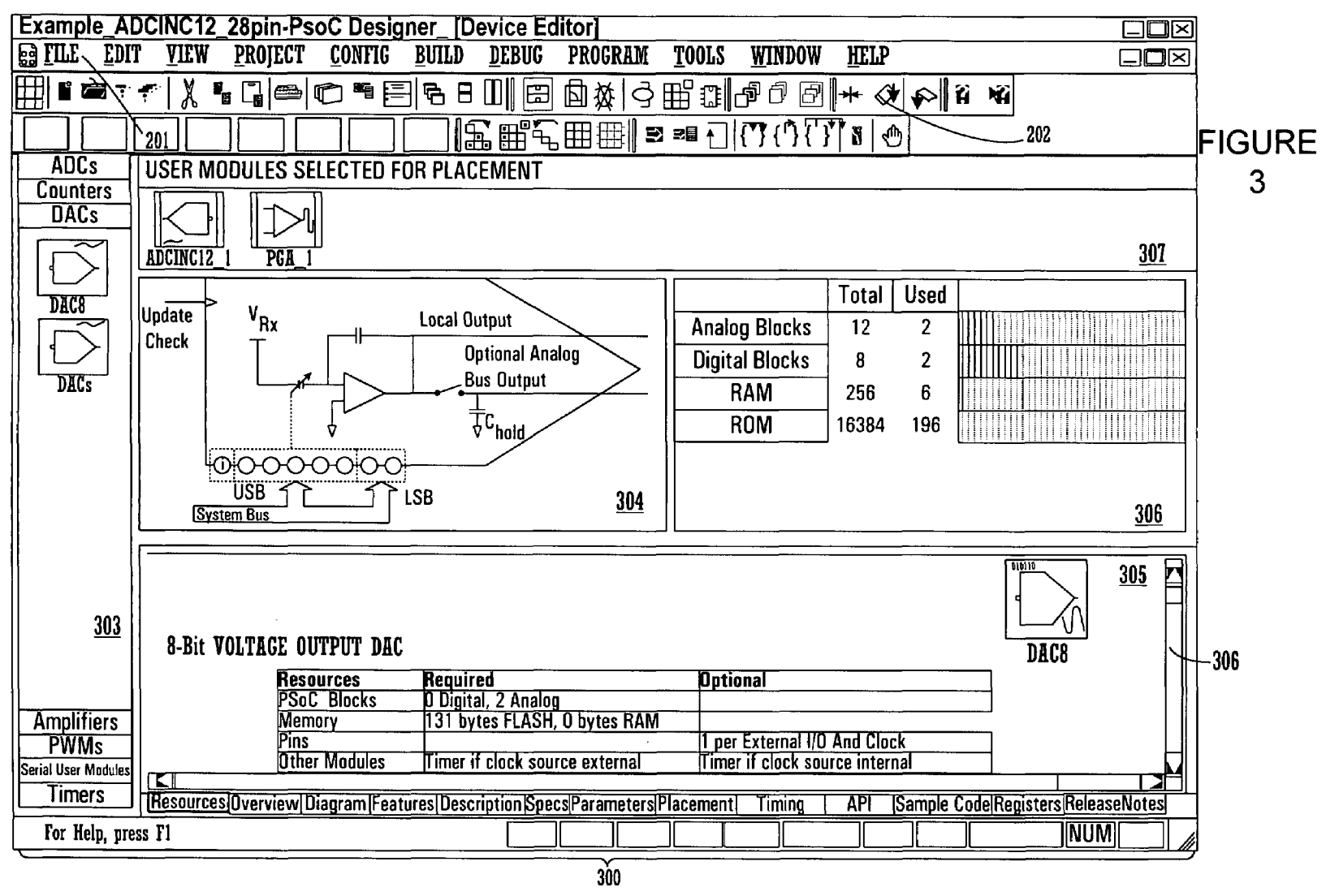

FIG. 3 illustrates a Device Selection Window in the configuration tool's graphical user interface. Device Selection Window 300 incorporates menu bar 201 and tool bar 202, as noted in FIG. 2, which are common to other windows within the graphical user interface. The embodiment of the present invention discussed here facilitates the configuration of functions to be implemented in the device being configured. In order to configure complex functions in a complex programmable device, functions in the form of blocks, or User Modules, are combined in various arrangements that accomplish the user's end goal. Functional user modules are selected in Device Selection Window 303 shown in FIG. 3 as mentioned above. In window 303, a library of user modules is graphically selected. When selected, the functional characteristics of a user module are presented in window 305 and a user module icon is added to the group of selected user modules represented in window 307.

FIG. 3 also illustrates window 304 which shows a graphical schematic diagram of the selected user module. The schematic is used to illustrate to the user the functionality of the user module and is not to be taken as being representative of the physical implementation of the module. Each module incorporated into a configured device is actually implemented in circuitry that is reconfigurable by programming. It should be remembered that the graphical user interface employed in this embodiment is one developed specifically for configuring programmable microcontrollers, but other graphical user interfaces could also incorporate this embodiment of the present invention.

It should be noted here the graphical user interface shown here is configured for a specific operating system (OS) as is indicated by some artifacts in the Figures. While such an existing operating system is quite common, this discussion in no way should be taken as to imply that use of the above operating system is integral to the concepts presented herein. Any other operating system capable of presenting a graphical user interface is equally capable of implementing similar embodiments. It is even conceivable that some implementation of an embodiment of the present invention could be employed on a personal data assistant or some other handheld device.

The graphical user interface referred to in this discussion of this embodiment of the present invention presents a number of window frames that contain various computer-aided design tools. While actual programming of the configurable device takes place elsewhere, the graphical user interface provides the user-friendliness and detail management necessary to an efficient programming operation.

Figure 4:
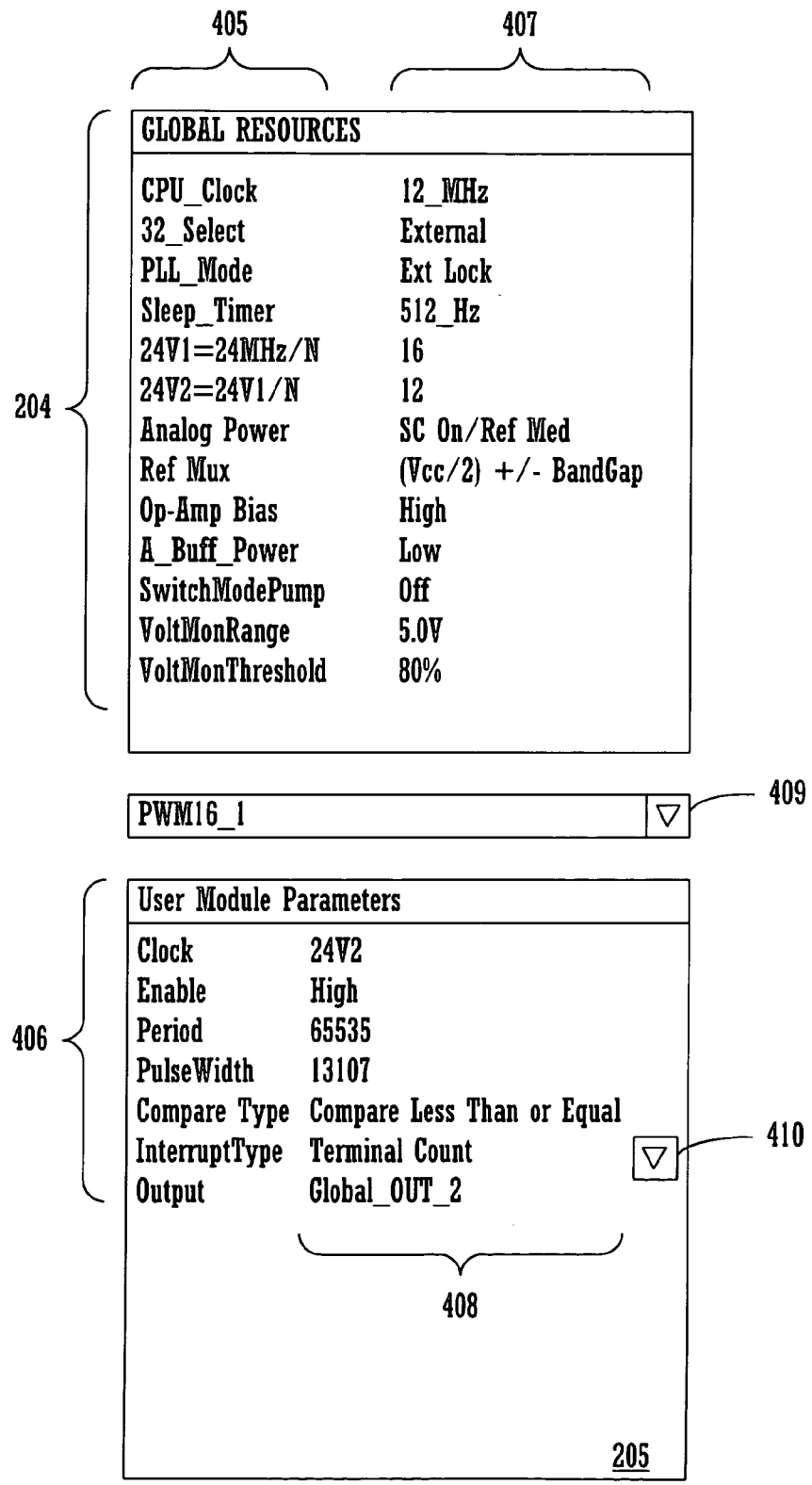
FIG. 4 illustrates a register parameter selection and setting window in accordance with one embodiment of the present invention.

This embodiment of the present invention includes user module parameterization window 205 in device placement window 200 of the device editor workspace shown in FIG. 2. FIG. 4 illustrates module parameterization window 205 in detail. When a user module has been placed, window 205 indicates some of the major or typical settings that can be used by the user module. Window 205 presents typical settings in a readable form and the user has the option of altering the settings directly. Area 406 of window 205 contains the parameter names associated with the functional user module and area 408 contains the values assigned to those parameters. Directly settable parameters can show a drop-down list or pop-up window, when selected, that offers acceptable settings. The drop-down list appears when the parameter value is selected or when the co-appearing scroll button, such as button 410, is selected. The user can interact with window 205 to select certain common settings. To adjust the gain of an amplifier to a specific value, to set a clock speed for a counter or to indicate the manner in which the counter should increment or decrement are examples of the types of parameter settings available. Other parameters and settings appear when other functional user modules are selected.

Figure 5:
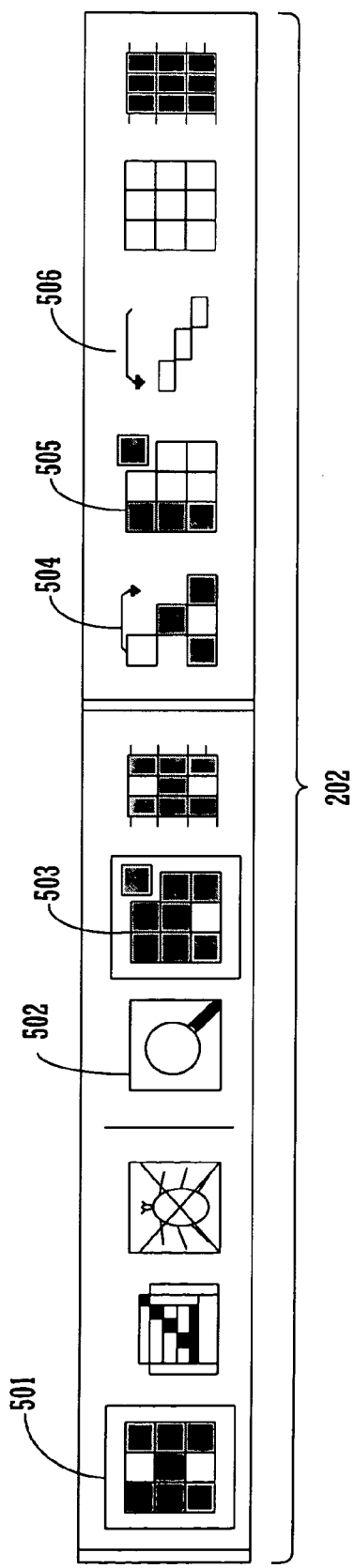
FIG. 5 illustrates a toolbar in a graphical user interface (GUI) in accordance with one embodiment of the present invention.

This embodiment of the present invention uses tool buttons in toolbar 202 to select the appropriate window for operation at hand. A portion of toolbar 202 is illustrated in FIG. 5. Toolbar 202 includes editing tool button 501, Device selection button 502, Device Placement button 503, Next (usable) Placement button 504, Place Module button 505, and Undo Placement button 506. Note that the arrangement of buttons and their iconic depictions are not limited to those shown. Other arrangements and icons could be used without changing the functions illustrated in this embodiment.

There is an additional feature of the popup windows and drop-down lists associated with register parameterization that aids the user's convenience. If no selection is made from a window or list, mouse clicking anywhere outside the window or list results in its disappearance. No specific closure or cancellation button is required to be selected.

The user module to which window 205 is addressed is selected from, and subsequently highlighted in, window 207 in FIG. 3. As discussed earlier, window 207 contains iconic links to all functional user modules to be included in the programmed device.

Once the settings have been selected by the user, this embodiment of the present invention automatically determines the hardware configuration registers that need to be set and automatically determines their values such that the settings can be realized. This last function needs user module placement to perform because the registers that are configured reside within the configurable hardware blocks that are allocated to the user module. Each configurable hardware block contains its own register set. If the user module placement is changed, then the configuration tool software recomputes the proper configuration registers and values for the new hardware. If the settings are changed, then this embodiment recomputes the proper configuration registers and values for the new settings.

Figure 6:
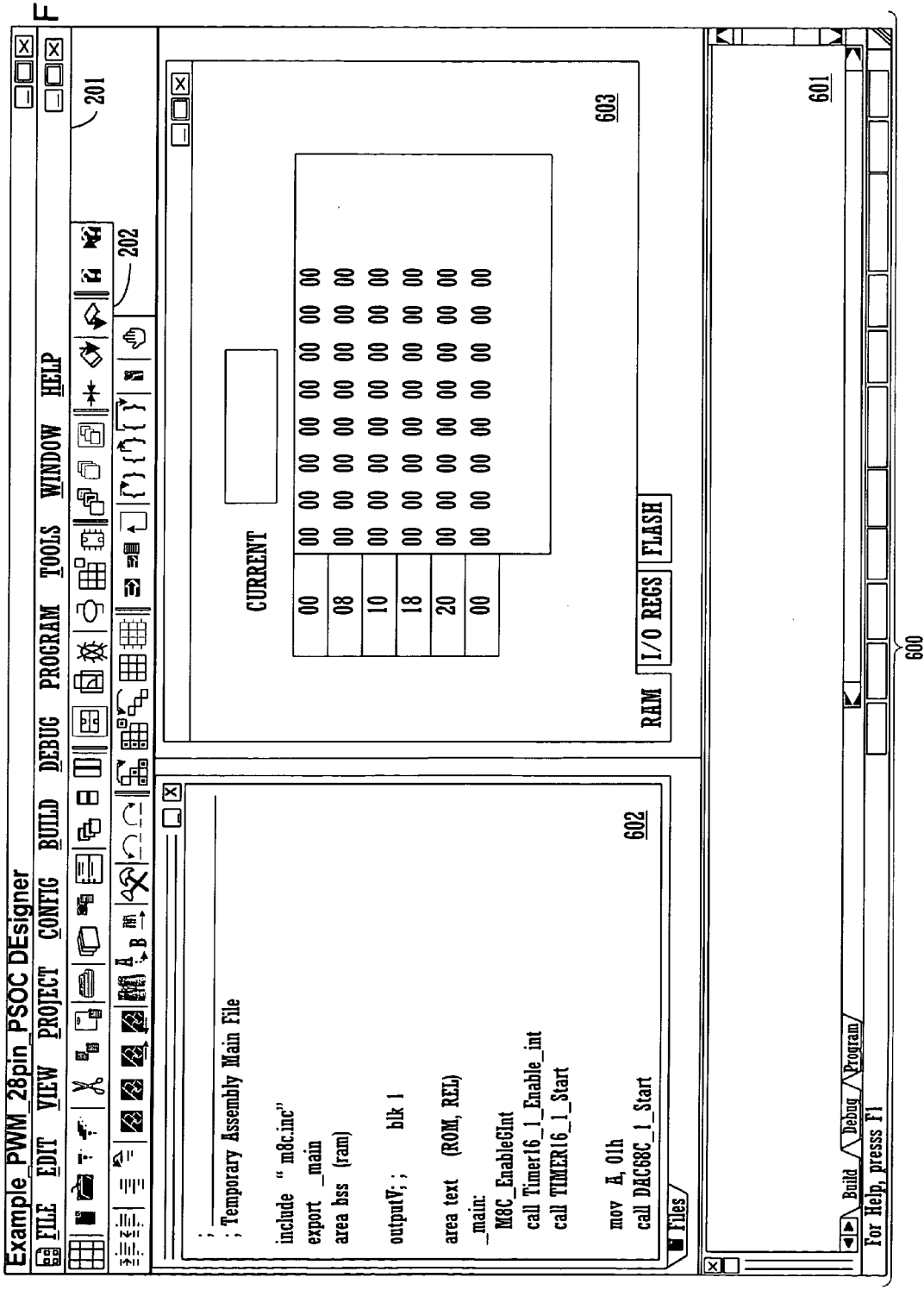
FIG. 6 illustrates a debugger window in accordance with one embodiment of the present invention.

Hardware registers, in this embodiment, are listed and their stored values shown in registers window 603 in debugger window 600 shown in FIG. 6. FIG. 6 also illustrates assembly code editor window 602 and output window 601 as well as menu bar 201 and toolbar 202. It is noted here that the arrangement of windows shown in FIG. 6 and other Figures is in no way a limiting arrangement. This embodiment provides a near infinite configurability of the windows used in the graphical user interface.

When functional user modules are selected and placed, registers are automatically determined and configured to implement the selected settings and information based on the settings is passed to processes that automatically generate source code blocks which are also called application program interfaces (APIs). These APIs are used to talk to the user modules to implement embedded functionality of the user module. The assembly code (.asm) that is automatically generated is used by the programmer to cause the user modules to perform the desired tasks. Common functions that are required to interact with the user module, such as how to start, stop a timer and talk to a timer, for example, are automatically generated and represented in assembly code and header files within the software configuration tool. These automatic configuration code generation processes receive setting information from the parameterization shown in window 205 and are slightly altered thereby such that the proper settings are realized.

The configuration tool automatically determines the configuration register names and configuration register values for implementing a selected user module setting based on selection and placement information. Open source code, that can be directly edited by the user, is automatically generated when the user is ready and selects application generation. The open source code is, in this embodiment, open assembly language code and C Compiler source files which are shown in the main window 602 of debugger 600 in FIG. 6. Each file can be opened as a separate window and edited and debugged separately.

Figure 7:
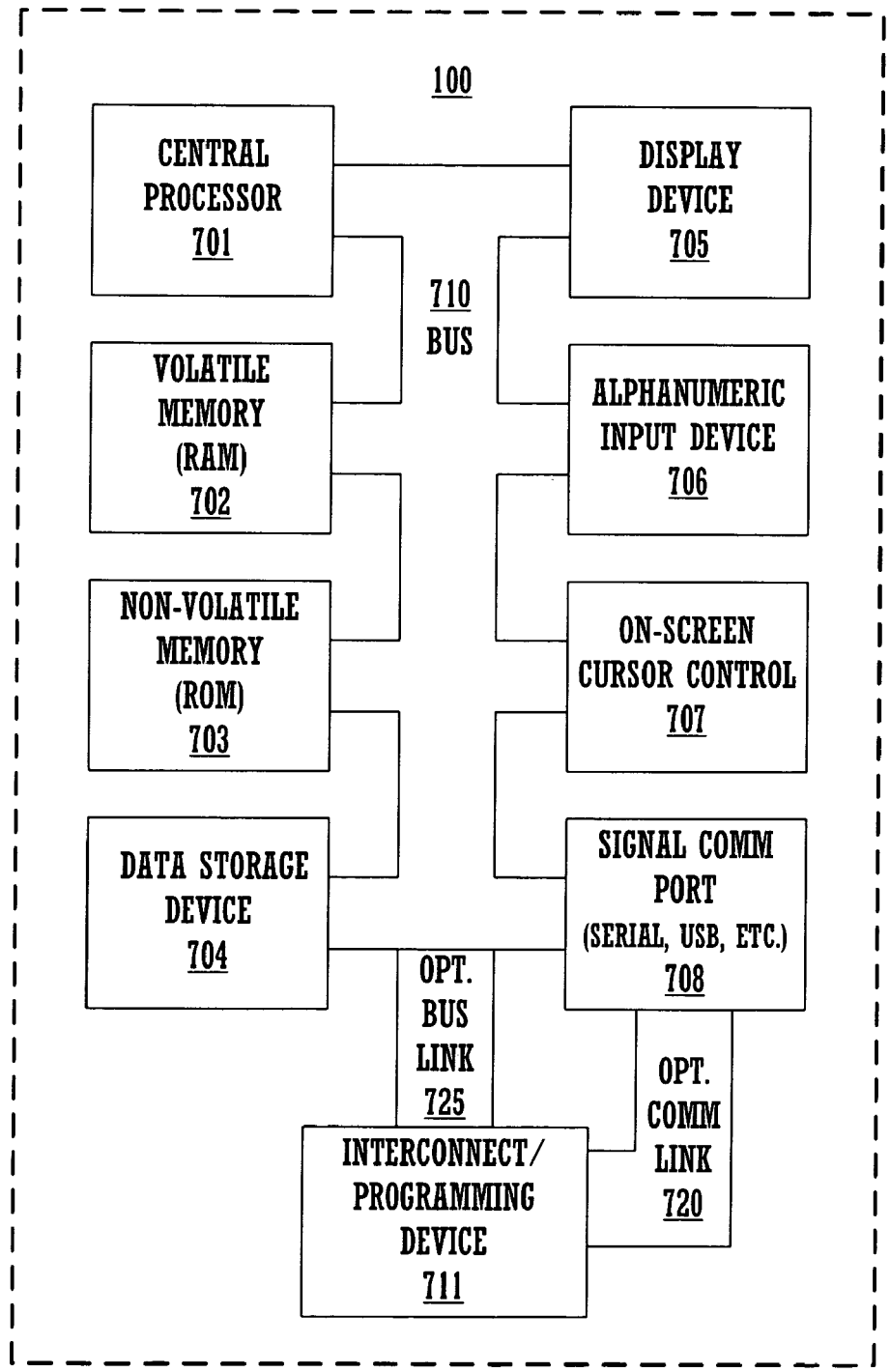
FIG. 7 illustrates a generic computer such as would be used in accordance with one embodiment of the present invention.

An embodiment of the present invention discussed here may be implemented in a computer similar to the generic computer illustrated in FIG. 7. FIG. 7 illustrates, in block diagram form, a configuration typical to a computer system. In FIG. 7, computer system 700 comprises bus 710 which electronically connects central processor 701, volatile RAM 702, non-volatile ROM 703 and data storage device 704.

Important to a concept involving a graphical user interface, as does this embodiment of the present invention, display device 705 is also connected to the bus. Similarly connected are alpha-numeric input device 706, cursor control 707, and signal I/O device 708. Signal I/O device 708 can be implemented as a serial connection, USB, an infrared transceiver or an RF transceiver. The configuration of the devices to which this embodiment of the present invention applies may vary, depending on the specific tasks undertaken. In every case with which this embodiment of the present invention is involved, however, display device 705 and cursor control 707 are implemented in one form or other. In many implementations of this embodiment, it is highly probable that interconnect/programming device 711 is also connected to computer bus 710, whether directly by bus link 725 or indirectly by signal communication 108 and communication link 720. The purpose of device 711 in this embodiment is to actually implement in device hardware the configurations developed using embodiments of the present invention. Interconnect/programming device 711 can also be implemented as a part of the circuitry suite permanently connected to the electronic environment of the targeted device.

It is important to note that it is immaterial, as far as user module placement and configuration is concerned, whether the user employs either the preset register parameters or changes them in the register parameter window 205, as shown in FIG. 2. The process of user module placement and configuration in both cases involves changing values in a device configuration code that can be, ultimately, used to change values in registers resident in the device being configured. There can be a number of register values for each configuration of user module. By using the graphic user interface and selecting values from the drop-down lists, the user need not be concerned with remembering register values or other parameters for module configuration.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A method for configuring a programmable device, comprising:
   displaying a graphical user interface comprising a graphical presentation of said programmable device, said programmable device comprising a first functional user module;
   selecting a second functional user module in said graphical user interface;
   placing said second functional user module with said first functional user module in said graphical presentation of said programmable device;
   receiving input comprising a setting for said second functional user module;
   configuring said first and second functional user modules in said graphical user interface, said configuring comprising automatically identifying a register associated with placement of said second functional user module and automatically determining a register value that realizes said setting; and
   automatically generating configuration code to implement said configuring in said programmable device.

2. A method as described in claim 1, wherein said programmable device comprises a programmable microcontroller.

3. A method as described in claim 1, wherein said displaying of said graphical user interface presents a table of registers associated with said second functional user module in said programmable device.

4. A method as described in claim 1, wherein said configuring of said register is enabled by presenting a drop-down list of configuration options for said setting.

5. A method as described in claim 4, wherein said configuring of said register comprises selecting options from said drop-down list.

6. A method as described in claim 1, wherein said configuration code comprises register values.

7. A method as described in claim 1, wherein said placing of said second functional user module in said graphical presentation comprises implementing hardware connections in said programmable device.

8. A method as described in claim 1 wherein said placing of said second functional user module in said graphical presentation is enabled by a graphical display of connections in said second functional user module.

9. A graphical user interface for aiding the configuration of a programmable device, comprising:
   a device configuration window;
   a functional user module selection window in said device configuration window, wherein a functional user module is selected from said functional user module selection window and added to a representation of said programmable device in said device configuration window; and
   a functional user module configuration parameter table, wherein said graphical user interface is enabled to accept user input in the process of configuring said programmable device comprising said functional user module, said user input comprising a setting for said functional user module, said configuring comprising automatically identifying a register associated with placement of said functional user module and automatically determining a register value that realizes said setting.

10. A graphical user interface as described in claim 9, wherein said device configuration window is specifically tailored to program functional user module configurations in a programmable microcontroller.

11. A graphical user interface as described in claim 9, wherein said functional user module configuration parameter table comprises a pop-up window.

12. A graphical user interface as described in claim 11, wherein said pop-up window is enabled to appear when said functional user module is selected in said functional user module selection window.

13. A graphical user interface as described in claim 11, wherein said pop-up window is enabled to appear when said functional user module is selected in said functional user module selection window.

14. A graphical user interface as described in claim 9, wherein said configuration parameter table comprises value options for said setting.

15. A graphical user interface as described in claim 9, wherein said configuration parameter table comprises a drop-down list.

16. A graphical user interface as described in claim 15, wherein said drop-down list disappears from said graphical user interface when a mouse-click is made outside said drop-down list.

17. A computer-usable medium having computer-readable program code embodied therein for causing a computer system to perform a method comprising:
   displaying a graphical user interface for configuring a programmable device, said programmable device comprising a first functional user module;
   displaying a window in said graphical user interface for selecting a second functional user module;

displaying a window in said graphical user interface for placing said second functional user module with said first functional user module in a graphical presentation of said programmable device;

presenting configuration options pertinent to said second functional user module in said graphical user interface;

receiving a selection of a configuration option;

automatically identifying a register associated with placement of said second functional user module and automatically determining a register value that realizes said configuration option; and automatically generating configuration code to implement said second functional user module in said programmable device.

18. The computer-usable medium of claim 17, wherein said programmable device comprises a programmable microcontroller.

19. The computer-usable medium of claim 17, wherein said presenting said configuration options comprises showing a drop-down list.

20. The computer-usable medium of claim 17, wherein said presenting said configuration options is accomplished in a pop-up window.

21. The computer-usable medium of claim 17, wherein said configuration options comprise register values.

22. The computer-usable medium of claim 17, wherein said configuration options are editable.

23. The computer-usable medium of claim 17, wherein said configuration code comprises a register name and a register value.

24. The computer-usable medium of claim 17, wherein said configuration code is automatically written to a register in said programmable device.

* * * * *